US008402336B2

(12) United States Patent
McBeath et al.

(10) Patent No.: US 8,402,336 B2
(45) Date of Patent: Mar. 19, 2013

(54) HARQ PROCESS MANAGEMENT FOR CARRIER AGGREGATION

(75) Inventors: Sean McBeath, Keller, TX (US); Mo-Han Fong, Ottawa (CA); Zhijun Cai, Irving, TX (US); Mark Earnshaw, Kanata (CA); Youn Hyoung Heo, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 451 days.

(21) Appl. No.: 12/792,141

(22) Filed: Jun. 2, 2010

(65) Prior Publication Data

US 2010/0312994 A1    Dec. 9, 2010

Related U.S. Application Data

(60) Provisional application No. 61/185,001, filed on Jun. 8, 2009.

(51) Int. Cl.
*H04L 1/18* (2006.01)

(52) U.S. Cl. .......................... 714/749; 714/751

(58) Field of Classification Search .................. None
See application file for complete search history.

(56) References Cited

U.S. PATENT DOCUMENTS

| 2006/0092972 | A1* | 5/2006 | Petrovic et al. | 370/469 |
| 2007/0224930 | A1* | 9/2007 | Fukui et al. | 455/3.05 |
| 2010/0050034 | A1* | 2/2010 | Che et al. | 714/748 |

OTHER PUBLICATIONS

Hu et al., "Parallel Stop and Wait ARQ in UTMS—Performance and Modeling", 2004, Proceedings of the 2004 World Wireless Congress, San Francisco, CA.*
PCT International Search Report and Written Opinion, PCT/US2010/036050, Sep. 14, 2010.
Sony Corporation, Consideration for Restriction on H-ARQ Processing, TSG-RAN Working Group 1 Meeting #20, TSGR1#20(01)0513, May 21-25, 2001.
LG Electronics, HARQ Process Mapping Across Aggregated Component Carriers, 3GPP TSG RAN WG1 #57, R1-092125, May 4-8, 2009.

* cited by examiner

*Primary Examiner* — Gabriel Chu
(74) *Attorney, Agent, or Firm* — Fish & Richardson P.C.

(57) ABSTRACT

A method and apparatus for use with a mobile user agent configured to be able to communicate via N carriers, the method for managing Hybrid Automatic Repeat reQuest (HARQ) processes in a communication system that uses R HARQ process indicators (HPIs) so that the system can support a maximum of (R)(N) HARQ processes, the method comprising the steps of, using a processor running a program to perform the steps of, within the mobile user agent, identifying less than (R)(N) unique HPI/carrier combinations, instantiating HARQ process buffers, associating each of the identified HPI/carrier combinations with at least one of the instantiated HARQ process buffers, receiving data, identifying HPI/carrier combinations associated with the received data and, where the HPI/carrier combination associated with received data is one of the identified combinations, delivering the data to the buffer associated with the HPI/carrier combination.

25 Claims, 12 Drawing Sheets

HARQ PROCESS MANAGEMENT FOR CARRIER AGGREGATION

This application is related to and claims priority from provisional U.S. patent application No. 61/185,001 that is titled "HARQ Process Management for Carrier Aggregation" which was filed on Jun. 8, 2009.

BACKGROUND

The present invention relates generally to data transmission in mobile communication systems and more specifically to methods for Hybrid Automatic Repeat Request (HARQ) process management for carrier aggregation.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the term "access device" will refer to any component, such as a traditional base station or an LTE or LTE-A access device (including eNBs), that can provide a UA with access to other components in a telecommunications system.

In mobile communication systems such as the E-UTRAN, an access device provides radio access to one or more UAs. The access device comprises a packet scheduler for dynamically scheduling downlink traffic data packet transmissions and allocating uplink traffic data packet transmission resources among all the UAs communicating to the access device. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a scheduling channel.

Several different data control information (DCI) message formats are used by LTE access devices to communicate data packet resource assignments to UAs including, among others, DCI formats 1 and 1A. An access device selects one of the DCI formats for allocating resources to a UA as a function of several factors including UA and access device capabilities, the amount of data to transmit to/receive from a UA, the amount of communication traffic within a cell, channel conditions, etc. UAs refer to the scheduling/resource allocation information for the timing and the data rate of uplink and downlink transmissions and transmit or receive data packets accordingly. In LTE, DCI formatted control data packets are transmitted via the Physical Downlink Control CHannel (PDCCH).

Hybrid Automatic Repeat reQuest (HARQ) is a scheme for re-transmitting a traffic data packet to compensate for an incorrectly received traffic packet. A HARQ scheme is used both in uplink and downlink transmissions in LTE systems. Take downlink transmissions for example, for each downlink packet received by a UA, a positive acknowledgment (ACK) is transmitted on a Physical Uplink Control Channel (PUCCH) from the UA to the access device after a cyclic redundancy check (CRC) performed by the UA indicates a successful decoding. If the CRC indicates a packet is not received correctly, a UA HARQ entity transmits a negative acknowledgement (NACK) on the PUCCH in order to request a retransmission of the erroneously received packet. Once a HARQ NACK is transmitted to an access device, the UA waits to receive a retransmitted traffic data packet. When the HARQ NACK is received at an access device, the access device retransmits the incorrectly received packet to the UA. This process of transmitting, ACK/NACK and retransmitting continues until either the packet is correctly received or a maximum number of retransmissions has been reached.

In many cases it is desirable for an access device to transmit a large amount of data to a UA in a short amount of time. For example, a video cast may include large amounts of audio and video data that has to be transmitted to a UA over a short amount of time. As another instance, a UA may run several applications that all have to receive data packets from an access device essentially simultaneously so that the combined data transfer is extremely large.

One way to increase the amount of data that can be transmitted during a short period is to have an access device commence several (e.g., eight) data packet transmission processes in parallel. In HARQ scheme, there is a waiting time between the transmission of one packet and the reception of ACK/NACK response or between the reception of ACK/NACK and the retransmission. During this waiting time, the access device initiates another data packet transmission. To facilitate a HARQ scheme for each of a plurality of simultaneous packet transmissions, access devices and UAs are programmed to support parallel HARQ processes. To this end, each DCI formatted downlink resource grant on the PDCCH includes a three bit HARQ process number (HPN) or HARQ process identity/indicator (HPI) corresponding to an associated data packet. When a data packet is not correctly received, the incorrectly received packet and associated HPI are stored by the HARQ entity in a HARQ decoding buffer and a NACK is transmitted back to the access device to request retransmission of the data packet. The access device retransmits the data packet along with the HPI associated with the original transmitted data packet to the UA. When the retransmitted packet and HPI are received, the UA delivers the retransmitted packet to the HARQ process associated with the received HPI. The HARQ process attempts to decode the combined packet data and the HARQ process continues. Where the HPI is three bits, the maximum number of simultaneous HARQ processes is eight.

Another way to increase the rate of data transmission is to use multiple carriers (e.g., multiple frequencies) to communicate between an access device and UAs using carrier aggregation. Since the data transmissions in multiple carriers are operated independently, the number of separate HARQ processes required to manage additional data should also be increased. Currently there is one known way to increase the number of uniquely identifiable HARQ processes in a multiple carrier system. First, where multiple carriers are used, the UA HARQ entity can replicate the single carrier operation separate HARQ processes for each of the carrier frequencies in the usual fashion where the access device retransmits data packets using the same carrier as an original incorrectly received packet. For example, where the DCI format includes a three bit HPI and an access device and UA use four carriers, the access device and UA may facilitate eight separate HARQ processes for each of the four carriers for a total of thirty-two (i.e., 8N where N is the number of carriers) separate HARQ processes.

While multi-carrier systems are capable of facilitating large numbers of separate HARQ processes (e.g., forty in a case where five carriers and three bit HPIs are used), there are several reasons to limit the number of HARQ processes in at least some applications.

First, unfortunately, significant memory for HARQ buffer may be required to implement carrier aggregation (including, for example, soft bit combining where each received soft bit value is represented by several bits of memory associated with a set of HARQ processes), especially as the number of HARQ processes increases. Therefore, in some cases, limiting the total number of physical HARQ processes for UAs supporting carrier aggregation is desirable.

Second, using fewer than the maximum number of possible HARQ processes in a system enables a finer granularity when specifying a maximum achievable data transfer rate. In some cases, for example, it may be desirable to design UAs whose maximum data rate is equivalent to what could be carried on 1.5 or 2.5 carriers, in which case fewer total UA HARQ processes would be required. In contrast, where the maximum number of HARQ processes are supported, the maximum data rate granularity is in multiples of one carrier.

Third, as the number of carriers increases, trunking efficiency may also be expected to increase resulting in less need for the maximum number of UA HARQ processes. As the number of carriers increases, the percentage of time where the absolute maximum number of UA HARQ processes is required to support the peak achievable data rate (in a typically-loaded cell) decreases. Accordingly, there may be a less strict requirement, and it may be inefficient to support the maximum number of HARQ processes for multi-carrier implementations.

Where a multi-carrier system is to employ less than the maximum number of HARQ processes, there must be some way to map the three bit HPIs to specific HARQ process buffers in the UA.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
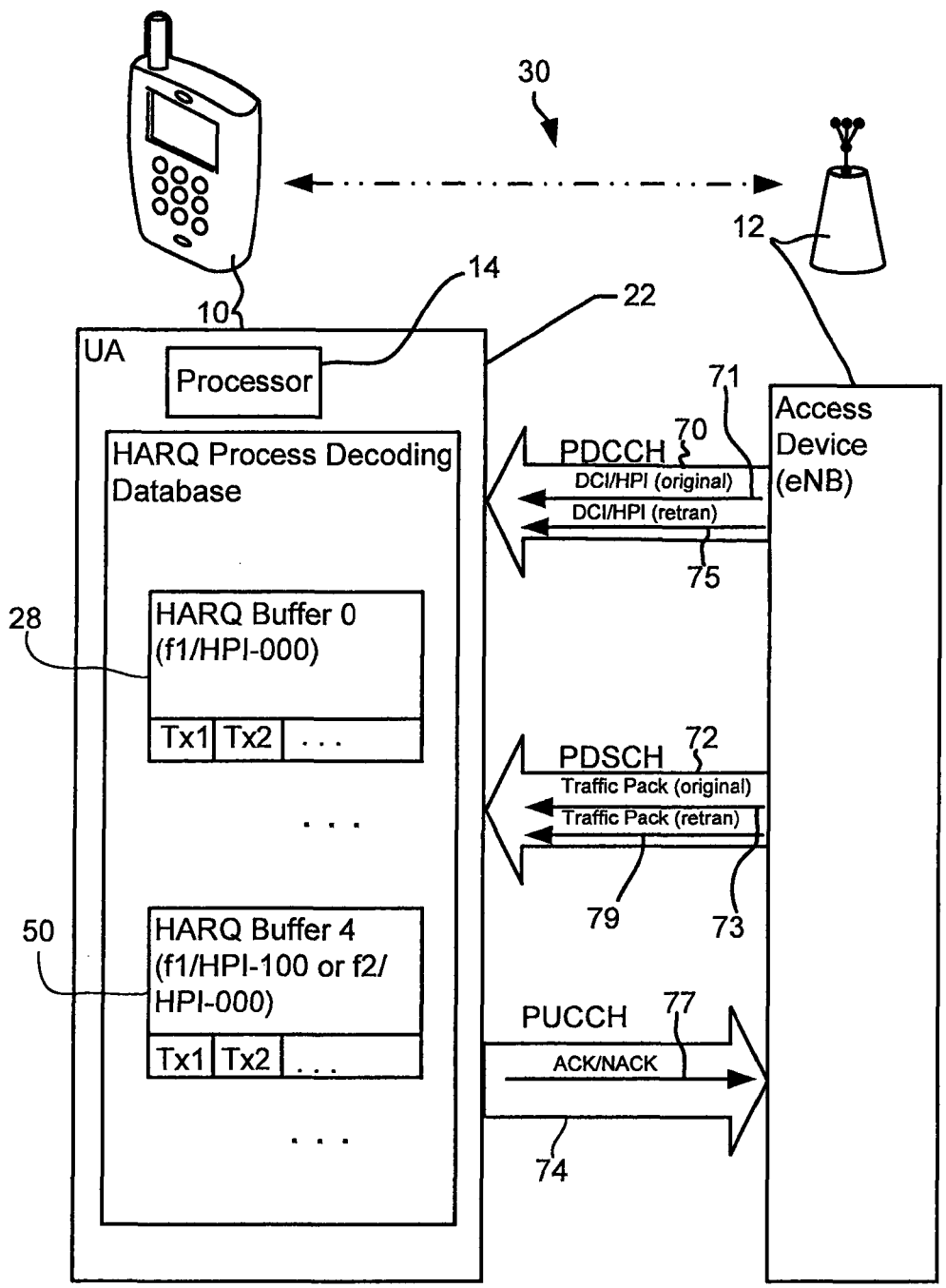
FIG. 1 is a schematic diagram showing components of a communication system including a user agent that includes a HARQ process decoding buffer/database.

It has been recognized that in a multi-carrier communication system that supports Hybrid Automatic Repeat reQuest (HARQ) processes, a total number of HARQ processes facilitated by a UA can be limited to a reasonable number that can meet communication needs in most situations. In this regard, for instance, where there are R HPI and where a system employs N carriers communicate so (R)(N) unique HPI/carrier combinations may be used to facilitate HARQ processes, the number of HPI/carrier combinations may be substantially less than (R)(N) and the associated number of HARQ processes may likewise be substantially less than (R)(N) thereby reducing the amount of memory required for HARQ processes buffers. It has also been recognized that there are several different ways that HPI/carrier combinations can be mapped to specific HARQ processes and the mapping methods are described herein.

In some cases the method is for use with a mobile user agent configured to be able to communicate via N carriers, the method for managing Hybrid Automatic Repeat reQuest (HARQ) processes in a communication system that uses R HARQ process indicators (HPIs) so that the system can support a maximum of (R)(N) HARQ processes, the method comprising the steps of, within the mobile user agent, identifying less than (R)(N) unique HPI/carrier combinations, instantiating HARQ process buffers, associating each of the identified HPI/carrier combinations with at least one of the instantiated HARQ process buffers, receiving data, identifying HPI/carrier combinations associated with the received data and where the HPI/carrier combination associated with received data is one of the identified combinations, delivering the data to the buffer associated with the HPI/carrier combination.

In some embodiments the step of identifying less than (R)(N) unique carrier combinations includes the steps of identifying a total HARQ process number $HP_{TOT}$ which indicates a total number of HARQ process buffers to be instantiated, receiving data from an access device, ascertaining the HPI/carrier combination associated with received data, where less than $HP_{TOT}$ HARQ process buffers are instantiated and the ascertained HPI/carrier combination is different than the HPI/carrier combinations already associated with existing HARQ process buffers, identifying the ascertained HPI/carrier combination as one of the less than (R)(N) unique carrier combinations.

In some embodiments at least two HPI/carrier combinations are associated with at least one HARQ process buffer. In some cases each of a first subset of HPI/carrier combinations associated with a first carrier is uniquely associated with a HARQ process and wherein each of a second subset of HPI/carrier combinations associated with the first carrier is associated with a HARQ process that is also associated with at least one HPI/carrier combination that is associated with a second carrier. In some cases the step of associating each of the identified HPI/carrier combinations with at least one of the instantiated HARQ process buffers includes fixedly mapping each identified HPI/carrier combination to a specific HARQ process buffer.

In some cases at least two HPI/carrier combinations are mapped to a single HARQ process buffer. In some cases the method further includes the step of, where at least two HPI/carrier combinations are mapped to a single HARQ process buffer, when data associated with a first of the at least two HPI/carrier combinations is currently stored in the single HARQ process buffer and data is received that is associated with a second of the at least two HPI/carrier combinations, ignoring the received data. In some cases the method further includes the step of, when an HPI/carrier combination associated with received data is other than one of the identified combinations, ignoring the received data.

In some cases the step of identifying less than (R)(N) unique HPI/carrier combinations includes identifying a total number of HARQ processes $HP_{TOT,k}$ for each carrier where k is a carrier index and where at least one $HP_{TOT,k}$ is less than R. In some cases the step of identifying less than (R)(N) unique HPI/carrier combinations further includes identifying an initial HARQ process $HP_{INIT,k}$ for each carrier and wherein the total number of HARQ processes $HP_{TOT,k}$ for each carrier starts at the initial HARQ process $HP_{INIT,k}$ for each carrier. In some cases the step of identifying less than (R)(N) unique carrier combinations includes the steps of receiving data from an access device indicating the number of HARQ processes $HP_k$ to be uniquely associated with at least one of the N carriers where k is a carrier index and assigning a unique HPI/carrier combination to each of the HARQ processes.

In some cases the carriers include first through Nth carriers and wherein the step of associating each of the identified HPI/carrier combinations with at least one of the instantiated HARQ process buffers includes, assigning HPI/carrier combinations sequentially beginning with the HPI/carrier combinations associated with the first carrier and continuing through the HPI/carrier combinations associated with the Nth carrier. In some cases the step of instantiating HARQ process buffers includes identifying a total HARQ process number $HP_{TOT}$ that indicates a total number of HARQ processes and wherein the step of associating HPI/carrier combinations with HARQ buffers further includes, where the sum of $HP_k$ for the N carriers is less than $HP_{TOT}$, associating HPI/carrier combinations for all of the N carriers with at least a subset of the HARQ processes that are not uniquely associated with a specific carrier.

Some embodiments include a method for use with a mobile user agent configured to communicate via a plurality of carriers, the method for managing Hybrid Automatic Repeat reQuest (HARQ) processes in a multi-carrier communication system, the method comprising the steps of, within the mobile user agent, determining a total number of HARQ processes ($HP_{TOT}$) for use by the user agent, determining an initial HARQ process number for each of the plurality of carriers, determining a total number of HARQ processes for each of the plurality of carriers ($HP_{TOT,k}$) and mapping HARQ process indicators (HPIs) for each of the plurality of carriers to HARQ processes on the user agent, each of the plurality of carriers being allocated a total of $HP_{TOT,k}$ HARQ processes starting at the initial HARQ process number of each carrier. In some cases the method further includes the steps of, when the combined number of HARQ processes for the plurality of carriers is more than $HP_{TOT}$, mapping a subset of HPIs for each carrier to at least one of the HARQ processes that is not uniquely associated with a specific carrier.

In some cases each initial HARQ process number for each of the plurality of carriers has a value from in the range from 0 to $HP_{TOT}-1$. In some cases the initial HARQ process number for each of the plurality of carriers is determined by solving the following equation:

$$HP_{INIT,k} = \left\lfloor \frac{HP_{TOT}}{N_{carrier}} \right\rfloor * k$$

where $HP_{INIT,K}$ is the initial HARQ process number for each of the plurality of carriers, $N_{carrier}$ is a total number of the plurality of carriers, and k is an index of each of the plurality of carriers.

In some cases the total number of HARQ processes is less than a total number of the plurality of carriers multiplied by a maximum number of HARQ processes that may be allocated to each of the plurality of carriers. In some cases the HARQ processes are identified by three bit numbers that can identify eight distinct HARQ processes. In some cases the total number of HARQ process is distributed among the carriers. In some cases the number of HARQ processes is evenly distributed between the carriers. In some cases the number of HARQ processes is unevenly distributed between the carriers by the access device.

In other cases the method is for use with a mobile user agent configured to communicate via a plurality of carriers, the method for managing Hybrid Automatic Repeat reQuest (HARQ) processes in a multi-carrier communication system, the method comprising the steps of, within the mobile user agent, determining a total number of HARQ processes ($HP_{TOT}$) that is less than the number of HARQ processes linearly increased by the number of carriers for use by the user agent, determining an initial HARQ process number for each of the plurality of carriers, determining a total number of HARQ processes for each of the plurality of carriers ($HP_{TOT,k}$) and mapping HARQ processes on the user agent to HARQ process indicators (HPIs) of each of the plurality of carriers, each of the plurality of carriers being allocated a total of $HP_{TOT,k}$ HARQ processes starting at the initial HARQ process number of each carrier.

In still other embodiment the method is for use with a mobile user agent configured to communicate via a plurality of carriers, the method for managing Hybrid Automatic Repeat reQuest (HARQ) processes in a multi-carrier communication system, the method comprising the steps of, within the mobile user agent, determining a smaller total number of HARQ processes ($HP_{TOT}$) than the number of HARQ processes linearly increased by the number of carriers for use by the user agent and designating HARQ processes as non-carrier-shared HARQ processes to be shared between carriers when the HARQ processes are mapped to a single one of the plurality of carriers. In some cases the method further includes the steps of receiving an HPI at the mobile user agent and mapping the received HPI to the available HARQ process.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views, FIG. 1, is a schematic diagram illustrating an exemplary multi-channel communication system 30 including a user agent (UA) 10 and an access device 12. UA 10 includes, among other components, a processor 14 that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data. Access device 12, in one implementation, may include an enhanced node B (eNB).

To facilitate communications, a plurality of different communication channels are established between access device 12 and UA 10. For the purposes of the present disclosure, referring to FIG. 1, the important channels between access device 12 and UA 10 include a Physical Downlink Control CHannel (PDCCH) 70, a Physical Downlink Shared CHannel (PDSCH) 72 and a Physical Uplink Control CHannel (PUCCH) 74. (The Physical Uplink Shared CHannel (PUSCH) may also be used to carry HARQ ACK/NACK feedback on the uplink if the UA has a PUSCH resource grant.) As the label implies, the PDCCH is a channel that allows access device 12 to control UA 10 during downlink data communications. To this end, the PDCCH is used to transmit scheduling or control data packets referred to as downlink control information (DCI) packets to the UA 10 to indicate scheduling to be used by UA 10 to receive downlink communication traffic packets (i.e., non-control data to be used by applications run by UA 10). A separate DCI packet is transmitted by access device 12 to UA 10 for each traffic packet transmitted. In addition to including information indicating scheduling for an associated traffic packet, a DCI packet includes a HARQ process indicator (HPI) that can be used to facilitate a HARQ process, if necessary, for the traffic packet.

Exemplary DCI formats including format 1 and format 1A currently used in the E-UTRAN are described at sections 5.3.3.1.2 and 5.3.3.1.3 of 3GPP TS 36.212 V8.6.0 (2009-03) where it can be seen that the HPI/HPN for FDD currently comprises a three-bit field. Thus, the HPI can have eight distinct values. Exemplary DCI packets are indicated by communications 71 and 75 on PDCCH 70 in FIG. 1.

In FIG. 1, exemplary traffic data packets on PDSCH 72 are labeled 73 and 79. In at least some embodiments a traffic packet will be transmitted via the same carrier (i.e., the same frequency) as an associated DCI packet.

Referring to FIG. 1, the PUCCH 74 (in some cases a Physical Uplink Shared CHannel (PUSCH) may be used for the uplink ACK/NACK functionality) is used by UA 10 to transmit acknowledgement (ACK) and negative acknowledgement (NACK) signals (see 77 in FIG. 1) to access device 12 for each of the traffic packets received to indicate either correct or incorrect packet reception, respectively. Where a traffic packet is not received correctly and a NACK is transmitted back to access device 12, access device 12 typically transmits another DCI packet (see 75 in FIG. 1) and retransmits the incorrectly received traffic packet (see packet 79 in FIG. 1) to UA 10.

Referring still to FIG. 1, UA processor 14 maintains a HARQ process decoding buffer/database 22 in which incorrectly received data packets are stored along with information that uniquely identifies one of a plurality of HARQ processes associated with the incorrectly received packet(s). To this end, referring also to FIG. 3, exemplary buffer/database 22 may include a plurality of HARQ process matrices 28, 50, etc. Exemplary matrix 28 includes a single row in which incorrectly received traffic packets may be stored. Thus, for example, where an original traffic packet is incorrectly received, that packet would be stored, a second incorrectly received traffic packet (i.e., a packet retransmitted a first time) would be combined with the first and then stored, and so. As illustrated, matrix 28 corresponds to a first carrier frequency f1 and an HPI of 000. Thus, only incorrectly received traffic packets received on the first carrier frequency f1 and having HPI=0 are stored in matrix 28.

Similarly, matrix 50 is a shared HARQ process matrix. In FIG. 1, Matrix 28 includes a single row and an original traffic packet which is incorrectly received may be stored, and an incorrectly received retransmitted packet associated with the original incorrectly received packet may be combined with the first and then stored. Here, unlike HARQ process matrix 28 matrix 50 is a shared HARQ process matrix wherein incorrectly received packets on carrier f1 with HPI 100 or incorrectly received packets on carrier f2 with HPI 000 are included in the same matrix 28. In some embodiments, the HARQ matrix is only used for one carrier at a time, which corresponds to the case where retransmissions for a packet must occur on the same carrier as the initial transmission. In other embodiments, the HARQ matrix is shared from among carriers from one HARQ transmission to the next, which corresponds to the case where retransmissions for a packet can occur on a carrier other than the carrier used for the initial transmission.

It should be appreciated that, while the example in FIG. 1 only shows one non-carrier-shared HARQ matrix and one carrier-shared HARQ matrix, many other HARQ matrices may be facilitated up to a total number of 8N where the HPI is three bits and where N is the number of carriers.

Figure 2:
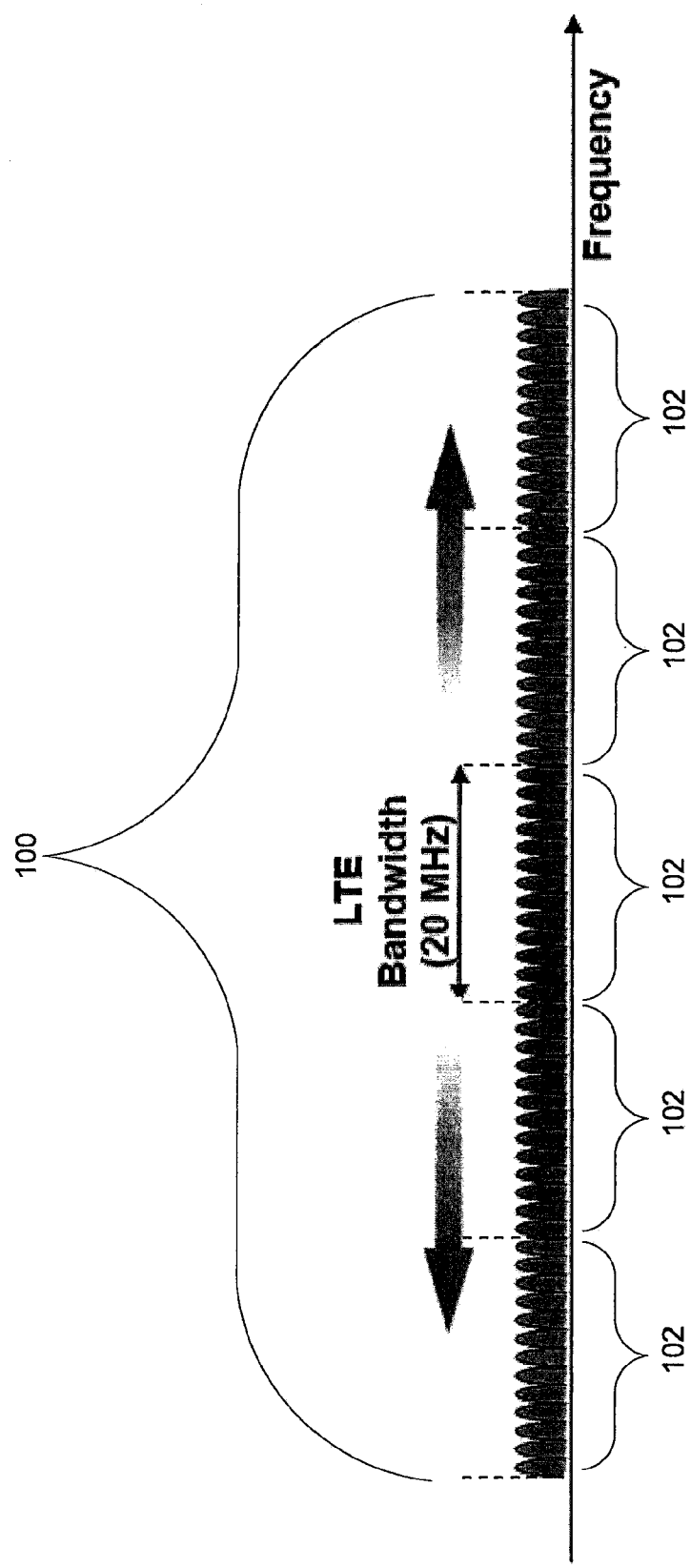
FIG. 2 is an illustration of carrier aggregation in a communications network where each component carrier has a bandwidth of 20 MHz and the total system bandwidth is 100 MHz.

Carrier aggregation is used to support wider transmission bandwidths and increase the potential peak data rate for communications between UA 10, access device 12 and/or other network components. In carrier aggregation, multiple component carriers are aggregated and may be allocated in a sub-frame to a UA 10 as shown in FIG. 2. FIG. 2 shows carrier aggregation in a communications network where each component carrier has a bandwidth of 20 MHz and the total system bandwidth is 100 MHz. As illustrated, the available bandwidth 100 is split into a plurality of carriers 102. UA 10 may receive or transmit on multiple component carriers (up to a total of five carriers 102 in the example shown in FIG. 2), depending on the UA's capabilities. In some cases, depending on the network deployment, carrier aggregation may occur with carriers 102 located in the same band and/or carriers 102 located in different bands. For example, one carrier 102 may be located at 2 GHz and a second aggregated carrier 102 may be located at 800 MHz.

The present system provides HARQ process number management for communications networks including, for example, LTE-A implementations. The system may be implemented to manage HARQ processes on a number of wireless or other communication systems, such as the system illustrated in FIG. 1. Using the present system, fewer than the total number of available HARQ buffers may be employed per carrier allowing for more efficient use of UA and access device memory. The use of fewer than the maximum number of UA HARQ processes allows for peak required data rates between a UA and an access device to be an equivalent to a fractional number of carriers (e.g., 1.5 or 2.5 carriers). This flexibility allows for more efficient use of network capacity and improved user experience.

In the following examples the PDCCH is presumed to be separately encoded for each carrier and have a 3-bit field for indicating the HARQ process number. Also, it is presumed that UA 10 and access device 12 negotiate a total number of HARQ processes ($HP_{TOT}$), where $HP_{TOT}$ is less than the theoretical maximum number of HARQ processes (i.e., less than 8N in the present example). If the access device does not configure $HP_{TOT}$, a default $HP_{TOT}$ is the maximum number of HARQ processes defined for the UA (in many networks eight times the number of active carriers).

The total number of HARQ processes $HP_{TOT}$ may be communicated between the access device and the UA implicitly or explicitly. For example, UA category data may implicitly define an $HP_{TOT}$ and/or other information and can be exchanged with the access device by UA capability signaling, or the UA explicitly exchanging the information ($HP_{TOT}$) with the access device. In other implementations of the present system, the encoding scheme for the PDCCH (or any other information communicated between the UA and the access device) may be adjusted in accordance with system requirements. Also, the maximum number of HARQ processes per carrier may be adjusted, for example, with each carrier having a different maximum number of HARQ processes.

The total number of HARQ processes $HP_{TOT}$ can be negotiated together with the number of component carriers as a single capability, or separate from the number of component carriers as, essentially, two capabilities as illustrated in Tables 1 and 2 below. Table 1 and Table 2 provide example UA category parameter sets, and other potential parameter sets are possible. Table 1 illustrates combined component carrier and HARQ process negotiation (single capability), while Table 2 illustrates combined component carrier and HARQ process negotiation (separate capabilities).

TABLE 1

| UE Category | Number of Component Carriers | Total Number of HARQ Processes ($HP_{TOT}$) |
|---|---|---|
| 1 | 1 | 8 |
| 2 | 2 | 16 |
| 3 | 3 | 24 |
| 4 | 4 | 32 |
| 5 | 5 | 40 |

TABLE 2

| UE Category | Number of Component Carriers | Total Number of HARQ Processes ($HP_{TOT}$) |
|---|---|---|
| 1 | 1 | 8 |
| 2 | 2 | 12 |
| 3 | 2 | 16 |
| 4 | 3 | 16 |
| 5 | 3 | 20 |
| 6 | 3 | 24 |
| ... | ... | ... |
| Y | 5 | 40 |

Hereafter several distinct algorithms are provided for mapping a 3 bit HPI to a particular HARQ process.

Option 1

According to this solution explicit rules are not defined for managing HARQ processes. Instead, access device 12 is configured to use no more than $HP_{TOT}$ HARQ processes simultaneously when communicating with a particular UA 10 (see FIG. 1). For example, if $HP_{TOT}$ is five, access device 12 may schedule any five HARQ processes among all available HARQ processes for use in communicating with UA 10. In this example, access device 12 cannot schedule additional HARQ processes unless the first scheduled five HARQ processes are known to be cleared (or thought to be cleared, since eNB makes this determination based on information available to it, which may be in error). HARQ processes may be cleared based upon ARQ feedback, HARQ feedback, etc. In this implementation, however, potential error conditions exist. For example, if there is a NACK→ACK error (where a transmitted NACK signal is received as an ACK signal), UA 10 may maintain a particular HARQ buffer (waiting for a retransmission), while access device 12 considers the HARQ buffer cleared because access device 12 believes it received an ACK indicating that UA 10 successfully received and decoded the communication.

To mitigate the error conditions, the following schemes may be implemented either in combination, or alone. First, if UA 10 encounters a memory problem (e.g., UA 10 receives a grant from access device 12 and does not have a buffer available), UA 10 may be configured to clear the buffer with the most out-of-date information.

Second, if UA 10 encounters a memory problem (e.g., UA 10 receives a grant and does not have a buffer available), UA 10 may attempt to decode the packet. If the decoding is unsuccessful, UA 10 does not store the soft values associated with the current transmission. Instead, UA 10 maintains the existing status of the HARQ buffers. As a result, existing transmissions are prioritized over new transmissions. If decoding is successful, the UA 10 passes the decoded packet to the higher layers.

Third, access device 12 may normally use less than $HP_{TOT}$ HARQ processes so that error conditions are not encountered as frequently.

Fourth, if UA 10 encounters a memory problem (e.g., UA 10 receives a grant and does not have a buffer available), UA 10 may send a message to access device 12 requesting information on the state of the buffers as perceived by access device 12 to be sent to UA 10. Access device 12 responds with a listing of available HARQ buffers or a list of unavailable buffers, both of which may be indexed as 'carrier index, HPI'.

Alternatively, after receiving a message from UA 10 on the state of the buffers, access device 12 may send a grant corresponding to a particular HARQ process to clear with the new data indication. For example, as well known in the art, in LTE, the toggled NDI (New Data Indicator) bit indicates new data is coming and the corresponding HARQ buffer should be cleared. Finally, access device 12 may signal the priority level for the related transmission in the DCI format. As such, if a new HARQ initial transmission is received, UA 10 may clear the HARQ buffer with the lowest priority. In that case, an indication may be sent to access device 12 about the buffer status of UA 10 so the corresponding data is not always assigned to the RLC entity for slow Automatic Repeat reQuests (ARQ) retransmissions.

In the present system, there are four primary potential error conditions that may arise. In many network implementations, the error events are sufficiently rare that they are unlikely to occur within close time proximity of each other. As discussed below, the present system is configured to detect and/or mitigate the error conditions.

In a first error condition, a false negative (or mis-detect of a resource assignment) on the PDCCH occurs. In the present system, the first error condition is mitigated because access device 12 will not receive HARQ feedback for the corresponding transmission and will therefore retransmit the transmission to the same HARQ process index. Even so, a mis-detect could cause the least-recently used HARQ process on UA 10 to vary because the HARQ process in question will not be updated. This is unlikely to become an issue, however, as the HARQ process is still likely to have been accessed recently. A more severe error situation would require the compounding of two proximate errors (for example, a false negative closely followed by a false positive).

In a second error condition, a false positive (or incorrect resource assignment detection) on the PDCCH occurs. The second error may cause a problem if the false positive resource assignment is for a HARQ process index that is not currently in use. If, however, a HARQ process of UA 10 is available, the unused HARQ process on UA 10 becomes associated with the HPI for the false positive, and is eventually released or otherwise made available (e.g. through the most-out-of-date approach) when no further transmissions are received for that HPI. However, if UA 10 is already using all available HARQ processes and receives a false positive, then UA 10 may take one of the HARQ processes on UA 10 that is already in use and associate that HARQ process with the falsely-detected HPI potentially causing problems such as loss of data, and/or degraded performance. As one potential solution, if UA 10 already has an HPI that is available for new data on the current carrier (for example, an HPI identifying a HARQ process that transmitted an ACK as its most recent HARQ feedback and is, therefore, available for new data), and receives a new data allocation for a different HPI (not currently associated with a HARQ process) on the same carrier, then UA 10 should consider this to be a false positive and disregard it.

A third error condition involves an ACK→NACK error in the HARQ feedback from UA 10 to access device 12. The third error condition may result in UA 10 believing that the corresponding HARQ process on UA 10 was available (for reassignment, if necessary), whereas access device 12 may wish to continue transmitting data to and using the same HARQ process. In that case, if UA 10 maintains the parameters (e.g. NDI flag) for all possible HPIs and maintains a reduced set of HARQ soft buffers (with these latter buffers being the HARQ components that require large amounts of memory), then the third error condition may be mitigated. For example, if UA 10 receives a transmission to an HPI that has already been successfully decoded and the NDI flag is not toggled, then UA 10 may assume that the transmission is superfluous and delete it. At the same time, UA 10 may signal an ACK to access device 12.

A fourth error condition involves a NACK→ACK error in HARQ feedback. The fourth error condition results in access device 12 falsely believing that UA 10 has successfully received a particular data transmission. In that case, after access device 12 receives what it believes to be an ACK, UA 10 cannot indicate for a second time that UA 10 has not received the data in question. As such, data may be lost (although all or parts of the data could be transmitted via L2 ARQ if AM RLC (acknowledged mode radio link control) is in use). As such, access device 12 may consider the identified HARQ process on UA 10 to be available while UA 10 would consider the HARQ process as unavailable because the data has not yet been successfully decoded. This may become a problem in the event that access device 12 wishes to dynamically reassign the UA HARQ process to a different carrier immediately following a NACK→SACK error, for example. In the present system, the fourth error condition may be mitigated by requiring access device 12 to avoid using a HARQ process that access device 12 wished to dynamically reassign to another carrier for a certain period of time in order to increase the likelihood that the HARQ process being reassigned is the most out-of-date on UA 10.

Option 2

In some embodiments a fixed mapping for HPI index to HARQ process may be defined. Depending upon system requirements, any mapping may be used. For example, if HP$_{TOT}$ is 12 and UA 10 uses two carriers, then HPI indices 0-5 on a first carrier map to HARQ processes 0-5, and HPI indices 0-5 on a second carrier map to HARQ processes 6-11. In this case, each of the HARQ processes 0-11 are non-shared HARQ processes as in 28. Overlapping mappings are also possible. For example, if HP$_{TOT}$ is 12 and UA 10 uses two carriers, HPI indices 0-7 on the first carrier may map to HARQ processes 0-7, while HPI indices 0-7 on the second carrier may map to HARQ processes 4-11. In that case, HARQ processes 4-7 are shared between the two carriers as in 50. These mappings may be dynamically re-configured during ongoing communications. In one default configuration, the HP$_{TOT}$ is evenly distributed into the number of carriers, and the mapping is implemented in an increasing order. In some embodiments, the HP$_{TOT}$ is unevenly distributed into the number of carriers.

Figure 3:
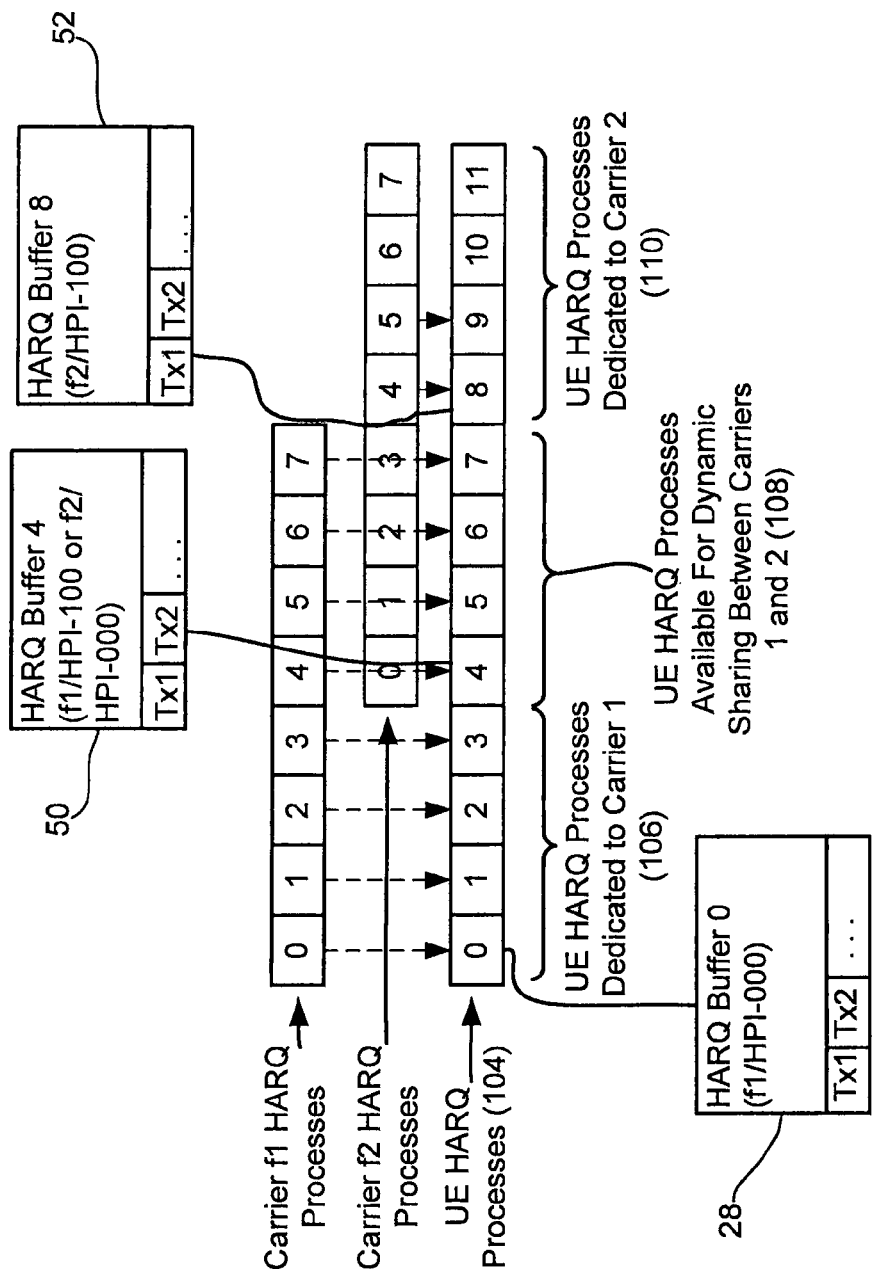
FIG. 3 is an illustration of a fixed mapping of carrier HPI index to user agent HARQ process.

FIG. 3 is an illustration of a fixed mapping of carrier HPI index to UA 10 HARQ processes. UA 10 is configured to access two carriers f1 and f2 and includes HARQ processes 104. As shown, dynamically shareable HARQ processes may be overlapped between different carriers. Four of the HARQ processes 106 on UA 10 (including processes 0 to 3) are dedicated only to carrier f1, and another four of the HARQ processes 110 (including processes 8 to 11) are dedicated only to carrier f2. Exemplary HARQ process 0 (see 28 in FIG. 3) corresponds to carrier f1 and HPI 000 and exemplary HARQ process 8 (see 52 in FIG. 3) corresponds to carrier f2 and HPI 100. The remaining four HARQ processes 108 on UA 10 (including processes 4 to 7) are shared between both carriers f1 and f2, with their use being determined by at least one of the HARQ process number, the subframe corresponding to the PDCCH, and an implicit or explicit indication of the carrier index in PDCCH downlink resource assignments. Exemplary shared HARQ process 4 (see 50 in FIG. 3) corresponds to either carrier f1 and HPI 100 or to carrier f2 and HPI 000. In one embodiment, retransmissions for a particular packet must occur on the same carrier as the original transmission. In this case, the NDI in the PDCCH is associated with a particular carrier. In other embodiments, retransmissions for shared HARQ processes can occur on any carrier associated with the shared HARQ process. In this case, the NDI field in the PDCCH is associated with the set of carriers corresponding to the shared HARQ process.

The implementation shown in FIG. 3 allows for dynamic sharing of the HARQ processes 104 on UA 10 between carriers f1 and f2 without requiring higher-layer semi-static reconfiguration signaling that adds time and overhead. For example, if the data traffic to UA 10 on carrier f1 was greater than for carrier f2, access device 12 may use all eight HARQ process indices on carrier f1 corresponding to HARQ processes 106 and 108 (including processes 0-7) and only the four highest HARQ process 110 indices on carrier f2 (corresponding to HARQ processes 8-11 on UA 10). In that case, if access device 12 wishes to dynamically reallocate HARQ processes between the two carriers, access device 12 stops using certain HARQ process indices on one carrier and begins using the HARQ process indices that correspond to those same shareable HARQ processes on UA 10 on another carrier. In another configuration, access device 12 may stop using HARQ processes 6 and 7 on carrier f1, and may stop using HARQ processes 4 and 5 on carrier f2, to evenly distribute the HARQ processes on UA 10 between each carrier f1 and f2.

When the association of a HARQ process on UA 10 is dynamically switched from one carrier to another in such a manner, the information associated with the HARQ process may be retained in each HARQ process. If, for example, HARQ retransmissions are permitted on a different carrier, the contents of and parameters (e.g. NDI flag) associated with a dynamically switched HARQ process may remain intact. In contrast, if HARQ retransmissions are only permitted on the same carrier as the original HARQ transmission, a HARQ process dynamically switched from one carrier to another may be cleared before use on the new carrier. By clearing the HARQ process, the initial transmission on the new carrier to the dynamically switched HARQ process is considered a new transmission. Another alternative is that the access device 12 performs the dynamical HARQ process switching only when the original HARQ transmission has been completed.

Figure 4:
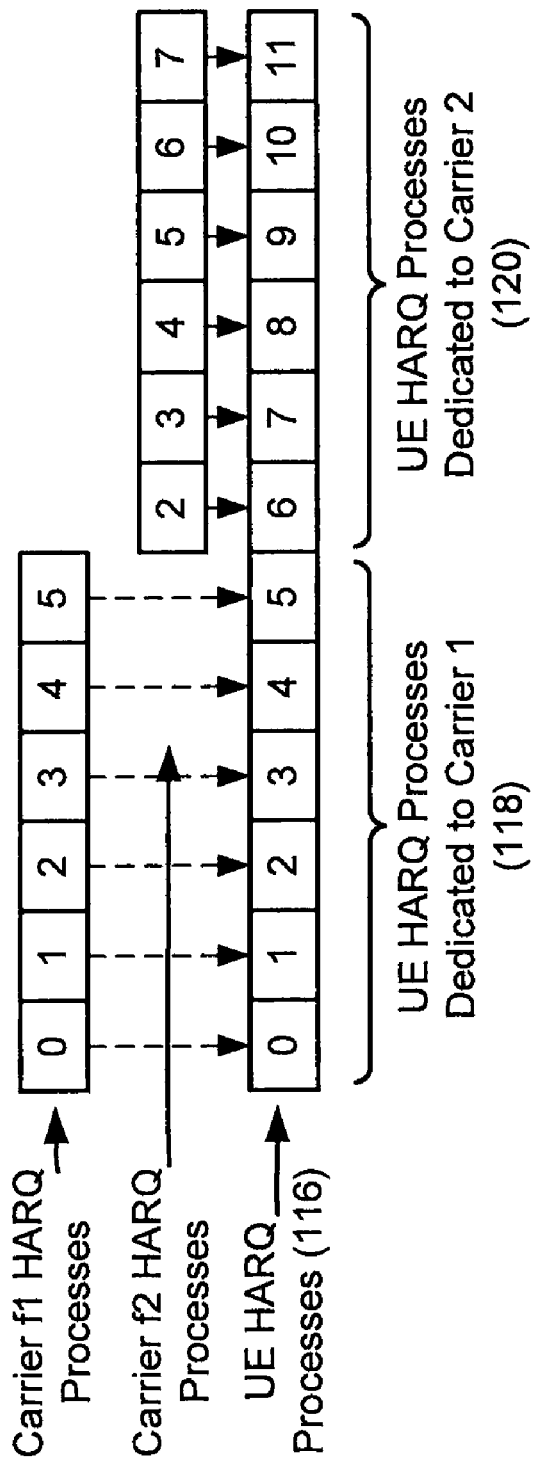
FIG. 4 is an illustration of a fixed mapping of carrier HPI index to HARQ process on a user agent with no overlapping HARQ processes between different carriers.

Alternatively, the system may disable the dynamic sharing of HARQ processes between different carriers. For example, FIG. 4 illustrates a fixed mapping of carrier HPI index to HARQ processes on UA 10 with no overlapping HARQ processes between different carriers. In FIG. 4, UA 10 accesses two carriers f1 and f2 and includes HARQ processes 0-11 116. Six HARQ processes on UA 10 are associated with each carrier, but none of the HARQ processes are shared between the two carriers—HARQ processes 118 (including processes 0-5) are associated with carrier f1, while HARQ processes 120 (including processes 6-11) are associated with carrier f2. In this example, if UA 10 receives a transmission on one of the carriers for a HARQ process index that is not associated with a HARQ process on UA 10 (e.g., processes 6 or 7 on carrier 1, or processes 0 or 1 on carrier 2), then UA 10 may determine that the reception was the result of a decoding error on the PDCCH and discard the data rather than store the data in a HARQ buffer.

Option 3

Alternatively, the mapping of HARQ processes may be quasi-flexible with UA 10 determining the assignment of HARQ processes using one or more equations and input values. In this implementation, each carrier is assigned an initial HARQ process (HP$_{INIT}$) having a value in the range 0, 1, ... HP$_{TOT}$−1. The value of HP$_{INIT}$ may be signaled explicitly or implicitly. For example, HP$_{INIT}$ for each carrier may be given by:

$$HP_{INIT\_k} = \left\lfloor \frac{HP_{TOT}}{N_{carrier}} \right\rfloor * k \qquad \text{Eq (1)}$$

where N$_{carrier}$ is a number of the configured carriers and k is the carrier index. If, however, the value of HP$_{INIT}$ is not explicitly signaled to UA 10, UA 10 may apply a default implicit configuration for allocating HARQ processes amongst available carriers. For example, the HPI indices 0-7 in the PDCCH may point to specific HARQ processes in UA 10 using a mapping algorithm. An example overlapping mapping may be determined by HP=mod(HP$_{INIT}$+HPI,HP$_{TOT}$). If access device 12 does not wish to use the default configuration, then access device 12 may explicitly signal the desired configuration to UA 10.

In addition to defining the beginning HARQ process, it may also be desirable to define a limit to the total number of HARQ processes for each carrier (HPI$_{TOT,k}$). There are several methods for defining HPI$_{TOT,k}$. For example, HPI$_{TOT,k}$ may be defined in the specification to have a specific value such as 8. Alternatively, access device 12 may signal a value to apply to all carriers, or may signal values for each carrier separately. Finally, each UA 10 may calculate the value of HPI$_{TOT,k}$ (e.g., using an equation such as:

$$HPN_{TOT,k} = \left\lfloor \frac{HP_{TOT}}{N_{carrier}} \right\rfloor).$$

In cases where $$\frac{HP_{TOT}}{N_{carrier}} \neq \left\lfloor \frac{HP_{TOT}}{N_{carrier}} \right\rfloor,$$

other functions may be employed that use all the available HARQ buffers, for example.

If $HP_{TOT,k}$ is less than the number of HARQ processes which may be indexed using the PDCCH, then some HPI indices for carrier k are not used by access device 12. For example, if $HP_{TOT,k}$ is 5, then access device 12 will only use HPI indices 000, 001, 010, 011, and 100 on carrier k. In such a situation, if UA 10 receives a resource allocation for an HPI index that UA 10 knows to be invalid (i.e. not associated with a HARQ process on UA 10), then UA 10 may assume that the resource allocation was the result of a decoding error on the PDCCH and discard the data rather than attempt to store the data in a HARQ buffer.

Figure 5:
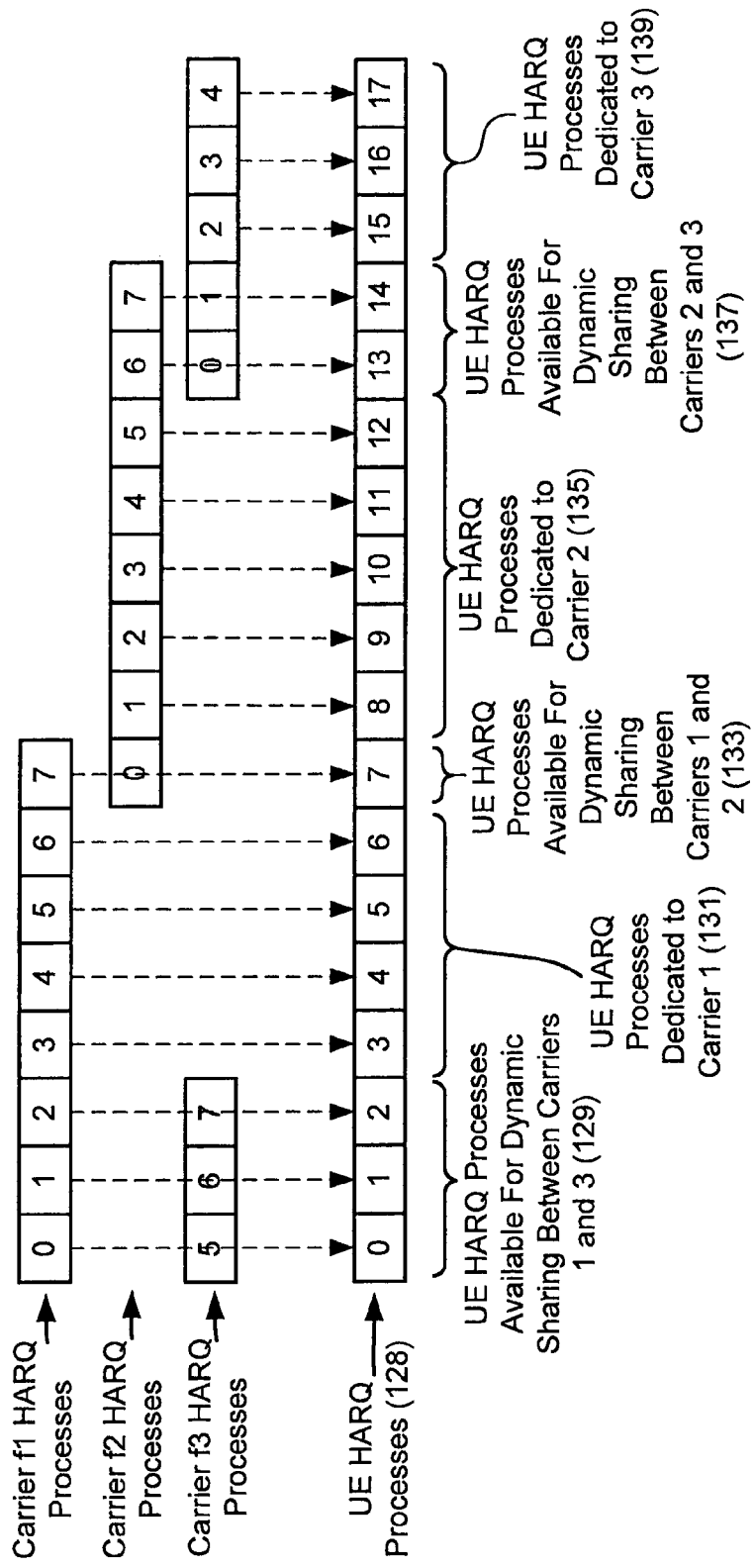
FIG. 5 is an illustration of an example of variable HPI mapping to HARQ processes on a user agent, where certain of the HARQ processes are shared between multiple carriers.

FIG. 5 is an illustration of an example of variable HPI mapping to HARQ processes on UA 10, where certain of the HARQ processes are shared between multiple carriers. In FIG. 5, there are three carriers f1, f2 and f3. UA 10 includes HARQ processes 128 with an $HPI_{TOT}$ of 18. The mapping of FIG. 5 is constructed using the example parameters shown in Table 3 below. As illustrated in Table 3, carrier f1 has an $HP_{INIT,K}$ value of 0 and can use a total of 8 processes. Accordingly, carrier f1 can access HARQ processes starting at process 0 through a total of 8 processes. Thus, carrier f1 on UA 10 can access HARQ processes 0-7 on UA 10. Of those processes, processes 0-2 (see 129) are shared with carrier f3 and process 7 (see 133) is shared with carrier f2 (i.e., processes 3, 4, 5 and 6 (see 131) are dedicated to carrier 1).

Carrier f2 has an $HP_{INIT,K}$ value of 7 and can use a total of 8 processes. Accordingly, carrier f2 can access HARQ processes starting at process 7 through a total of 8 processes. Thus, carrier f2 on UA 10 can access HARQ processes 7-14 on UA 10. Of those processes, process 7 (see 133) is shared with carrier f1 and processes 13-14 (see 137) are shared with carrier f3 (i.e., processes 8-12 (see 135) are dedicated to carrier f2).

Carrier f3 has an $HP_{INIT,K}$ value of 13 and can use a total of 8 processes. Accordingly, carrier f3 can access HARQ processes starting at process 13 through a total of 8 processes. As shown in FIG. 5, the HARQ processes available for carrier f3 wrap around the maximum value and extend through the lower-numbered HARQ processes. Thus, carrier f3 on UA 10 can access HARQ processes 13-17 and 0-2 on UA 10. Of those processes, processes 13-14 (see 137) are shared with carrier f2 and processes 0-2 (see 129) are shared with carrier f1 (i.e., processes 15-17 (see 139) are dedicated to carrier f3).

TABLE 3

| Carrier (k) | $HP_{INIT,K}$ | $HP_{TOT,k}$ |
|---|---|---|
| f1 | 0 | 8 |
| f2 | 7 | 8 |
| f3 | 13 | 8 |

As shown in FIG. 5, each carrier can use eight UA HARQ processes, with some processes being dedicated to a specific single carrier, while other processes can be shared between two carriers. The example configuration is such that each carrier has a different number of dedicated and shared HARQ processes. Shared HARQ processes can be dynamically switched between different carriers as described above.

Figure 6:
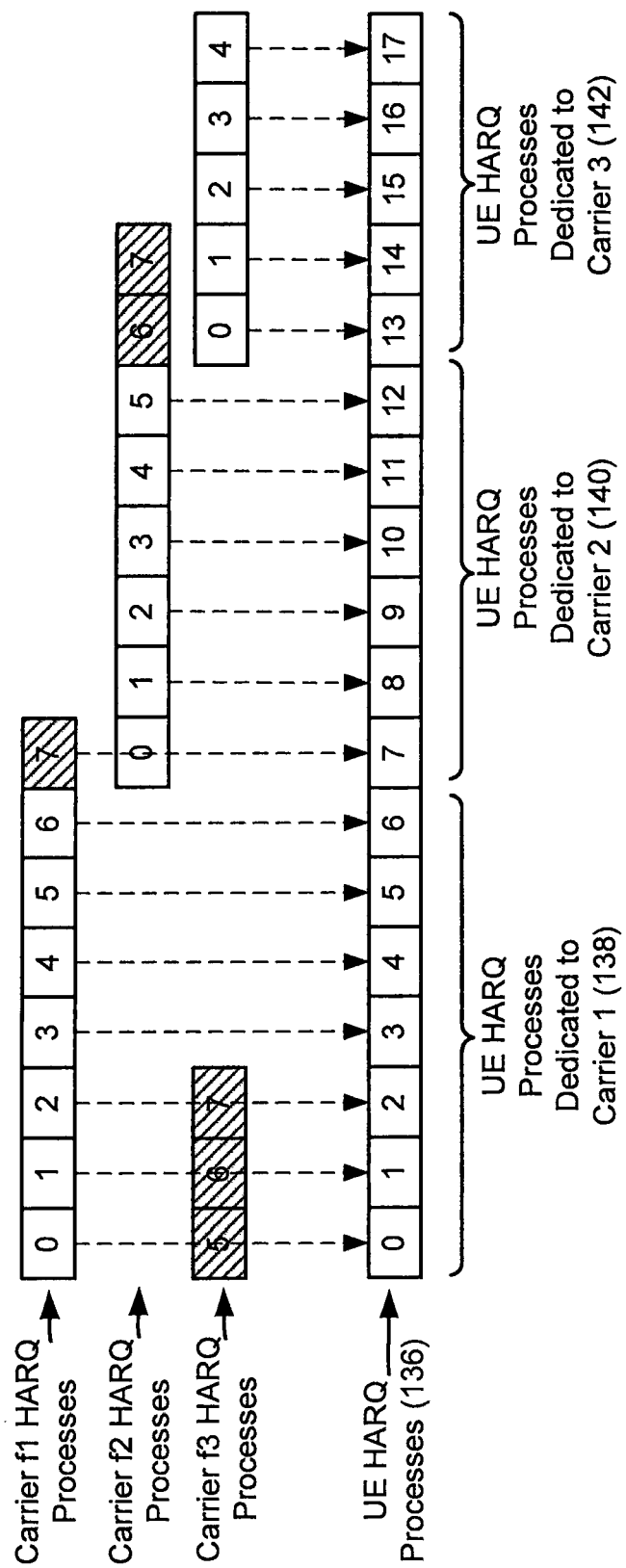
FIG. 6 is an illustration showing variable HPI mapping to HARQ processes on a user agent with a different number of dedicated HARQ processes per carrier.

Alternatively, the system may be configured so that shared HARQ processes are not allowed. FIG. 6 is an illustration showing variable HPI mapping to HARQ processes on a UA 10 with a different number of dedicated HARQ processes per carrier. In FIG. 6, processes 0-2, 7, 13 and 14 in cross hatch are not shared between carriers. The parameters for implementing the mapping structure of FIG. 6 are provided in Table 4 below.

As shown in Table 4, carrier f1 has an $HP_{INIT,K}$ value of 0 and can use a total of 7 processes. Accordingly, as shown on FIG. 6, carrier f1 can access HARQ processes starting at process 0 through a total of 7 processes. Thus, carrier f1 on UA 10 can access HARQ processes 138 (labeled 0-6) on UA 10, with no processes being shared with other carriers. Carrier f2 has an $HP_{INIT,K}$ value of 7 and can use a total of 6 processes. Accordingly, carrier f2 can access HARQ processes starting at process 7 through a total of 6 processes. Thus, carrier f2 on UA 10 can access HARQ processes 140 (labeled 7-12) on UA 10, with no processes being shared with other carriers. Carrier f3 has an $HP_{INIT,K}$ value of 13 and can use a total of 5 processes. Accordingly, carrier f3 can access HARQ processes starting at process 13 through a total of 5 processes. Thus, carrier f3 on UA 10 can access HARQ processes 142 (labeled 13-17) on UA 10, with no processes being shared with other carriers.

TABLE 4

| Carrier (k) | $HP_{INIT,K}$ | $HP_{TOT,k}$ |
|---|---|---|
| f1 | 0 | 7 |
| f2 | 7 | 6 |
| f3 | 13 | 5 |

Accordingly, as shown in FIG. 6, carrier f1 has access to 7 HARQ processes, carrier f2 has access to 6 HARQ processes, and carrier f3 has access to 5 HARQ processes. This approach does not allow HARQ processes on UA 10 to be dynamically switched between different carriers, but error conditions of disallowed HPI values may be identified at UA 10. For example, HPI 7 for carrier f1, HPIs 6 and 7 for carrier f2, and HPIs 5-7 for carrier f3 are all invalid values in this example and their attempted use can be identified as an error condition by UA 10.

Option 4

Alternatively, a number of dedicated HARQ processes per carrier is specified. In one implementation, access device 12 specifies a dedicated number of HARQ processes ($HP_k$, where k is the index of the corresponding carrier) to be associated with each of the available carriers. Alternatively, $HP_k$ may be specified for all but one of the carriers, with the last carrier determining its own $HP_k$ based upon a pre-determined algorithm. For example, $HP_k$ for the last carrier (e.g., the anchor carrier) may be calculated as:

$$HP_1 = \min\left(8, HP_{TOT} - \sum_{k=2}^{N} HP_k\right); \quad \text{Eq (2)}$$

Specifying a value of $HP_k$ for less than all carriers, however, may allocate more HARQ processes than are desired to the anchor carrier (i.e., the last carrier to be allocated HARQ processes) and thus reduce the number of HARQ processes that are available for dynamic sharing. If, however, HARQ processes remain unallocated, the remaining HARQ processes may be available for dynamic sharing among the carriers.

Figure 7:
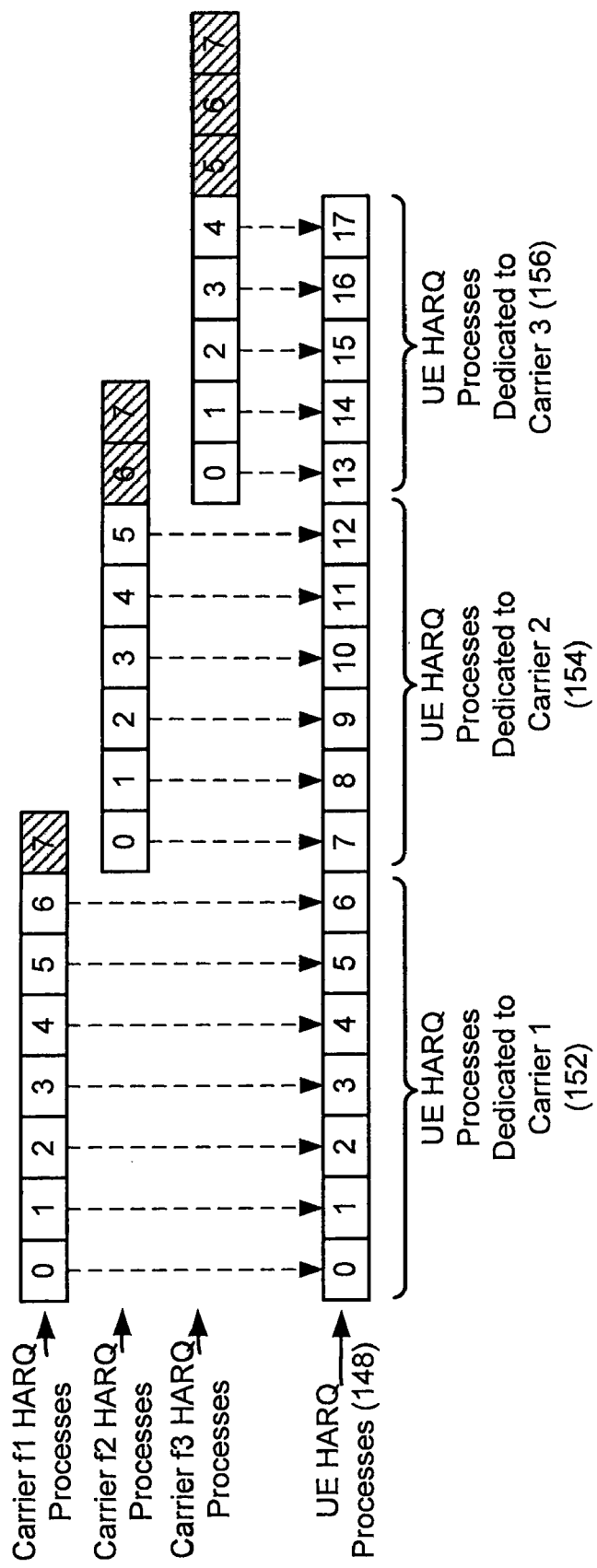
FIG. 7 is an illustration showing six dedicated HARQ processes specified per carrier amongst several carriers accessible to a user agent.

FIG. 7 is an illustration showing dedicated HARQ processes specified per carrier. UA 10 may access carriers f1, f2, and f3 and includes HARQ processes 148. In FIG. 7, the number of HARQ processes for carriers f2 and f3 is specified as $HP_{f2}=6$ and $HP_{f3}=5$ and communicated from access device 12. The number of HARQ processes for carrier f1 is determined by UA 10 as $HP_{f1}=HP_{TOT}-HP_{f2}-HP_{f3}=18-6-5=7$. As shown in FIG. 7, all of the HARQ processes are dedicated to one of the three carriers, and no HARQ processes are left over for sharing. FIG. 7 illustrates the allocation of HARQ processes amongst each of the carriers. The HARQ processes are allocated in an order corresponding to the carrier index. Carrier f1 is allocated HARQ processes 152 labeled 0-6. Carrier f2 is allocated HARQ processes 154 labeled 7-12. Carrier f3 is allocated HARQ processes 156 labeled 13-17. In this example, several HPI indices for each carrier are unused (e.g., indices 7 for carrier f1, 6 and 7 for carrier f3, and indices 5-7 for carrier f3). In FIG. 7, if indices 5-7 for carrier f3 were used, they would wrap around and be associated with HARQ processes 0-2 on UA 10. In this example, as above, if UA 10 decodes a DCI on the PDCCH referring to one of the unused HPI indices, UA 10 may assume a false positive detection has occurred and discard the DCI.

Figure 8:
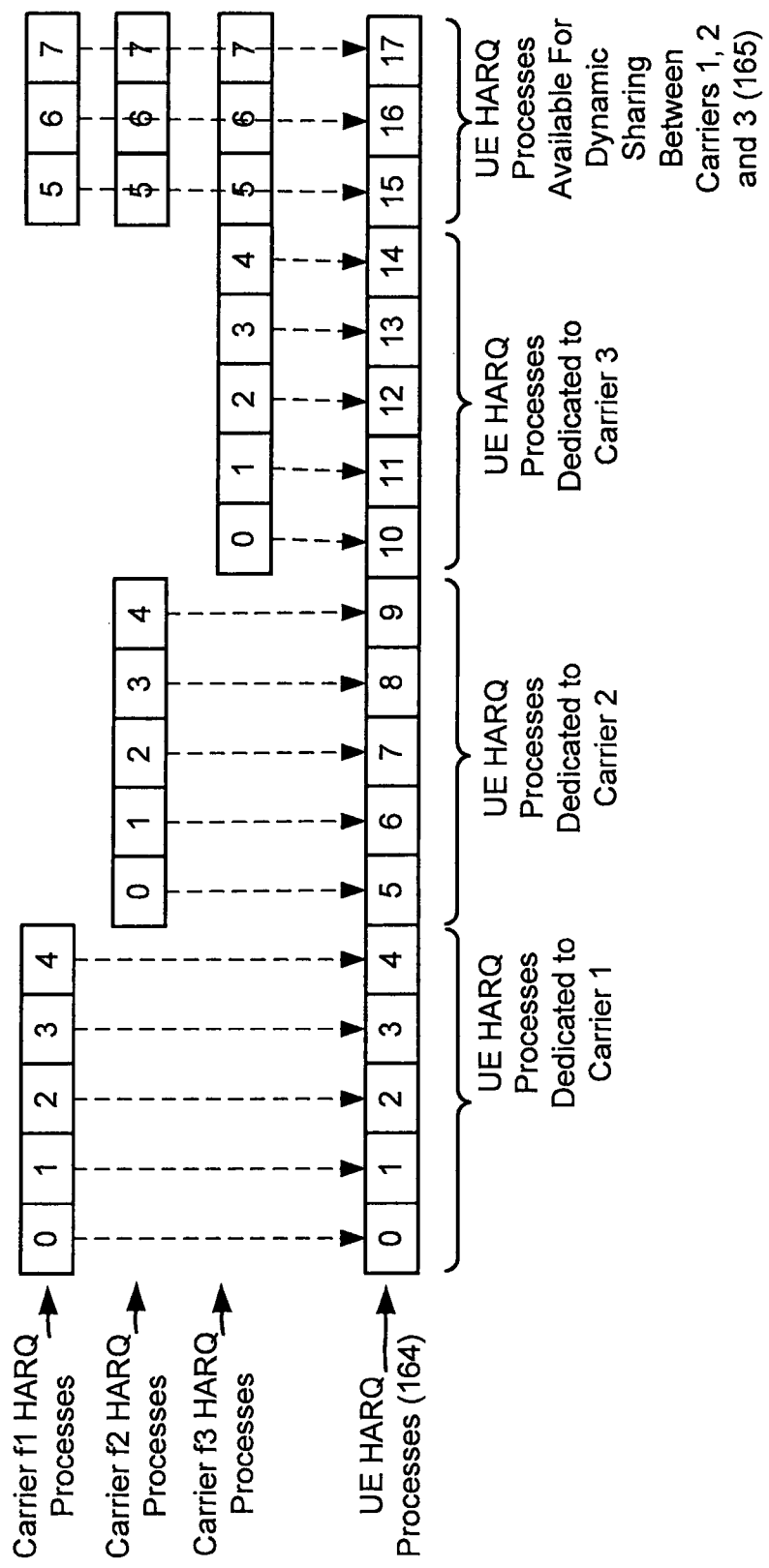
FIG. 8 is an illustration showing five dedicated HARQ processes specified per carrier, with three remaining HARQ processes shared amongst the carriers.

FIG. 8 is an illustration showing five dedicated HARQ processes specified per carrier, with three remaining HARQ processes shared amongst all three carriers f1, f2 and f3. UA 10 may access carriers f1, f2, and f3 and includes HARQ processes 164. In FIG. 8, all three $HP_k$ quantities for each carrier are signaled explicitly, with $HP_{f1}=HP_{f2}=HP_{f3}=5$. Because $HP_{TOT}=18$, there are three HARQ processes 15, 16 and 17 (see 165) that have been left over for dynamic sharing between each of the three carriers. As shown in FIG. 8, these three processes can be accessed via HPI indices 5, 6, and 7 on each carrier, with HPI indices 0 through 4 indexing the dedicated HARQ processes associated with a particular carrier. Note that the number of dedicated HARQ processes per carrier may not be equal.

The association of specific HARQ process numbers with HPI indices for the carriers as shown in FIG. 7 and FIG. 8 is shown for explanatory purposes only. Shared HARQ processes (e.g. 15, 16, and 17 in FIG. 8) could be dynamically swapped between the carriers as required. For example, if one of the HPI indices corresponding to a shared HARQ process on a carrier was indicated in a DCI resource allocation, then one of the unused shared HARQ processes (or least recently used, if no unused shared HARQ processes were available) would become associated with that HPI index. Consequently, any such shared HARQ process would need to be flushed or cleared if the HARQ process was swapped from one carrier to another since there is no way of guaranteeing that a particular shared HARQ process in use on one carrier can be accessed by another carrier (e.g. for HARQ retransmissions on a different carrier) unless further rules are introduced.

Option 5

In other implementations, a bitmap of length $HP_{TOT}$ is transmitted to UA 10 to facilitate the allocation of HARQ processes amongst one or more carriers. The bitmap contains at most eight 1s with the most significant 1 corresponding to HPI 000, the second most significant 1 corresponding to HPI 001, etc. This allows access device 12 flexibility in assigning the number of HARQ processes amongst available carriers as well as pointing to a specific HARQ process in UA 10. This bitmap could be signaled during the call setup via the RRC signaling and could be updated later via RRC signaling or MAC CE control signaling.

In all the above alternatives, there may be a default configuration that the UA 10 needs to be used at the call setup stage. The default configuration can be fixed as specified in the specification or can be deduced by the UA based on at least one of the following, the number of carriers assigned to the UA, the $HP_{TOT}$ or other system broadcast information from the access device. The default configuration may be updated during the call via the RRC signaling or MAC CE control signaling. Different options may have different signaling design.

Figure 9:
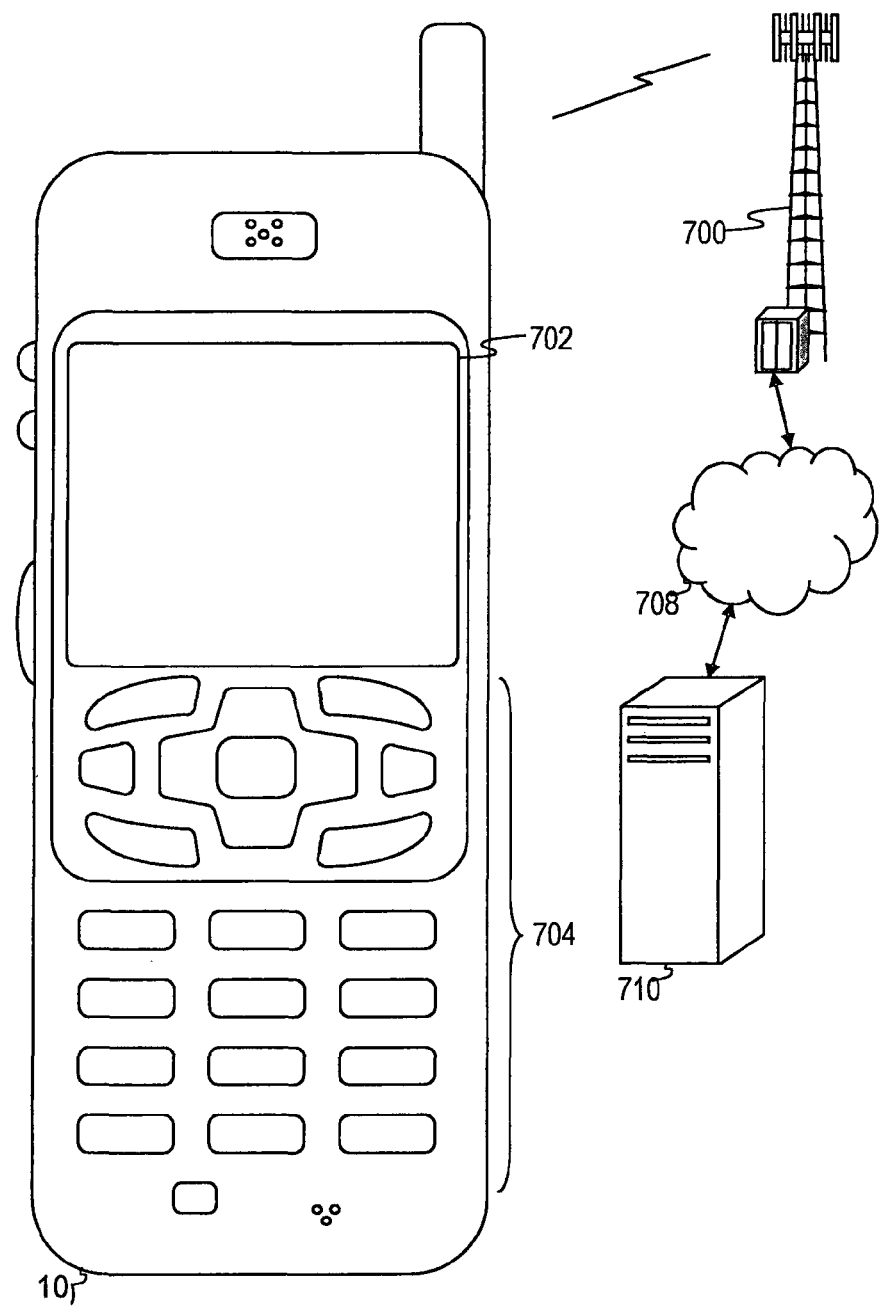
FIG. 9 is a diagram of a wireless communications system including a user agent operable for some of the various embodiments of the disclosure.

FIG. 9 illustrates a wireless communications system including an embodiment of the UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 10:
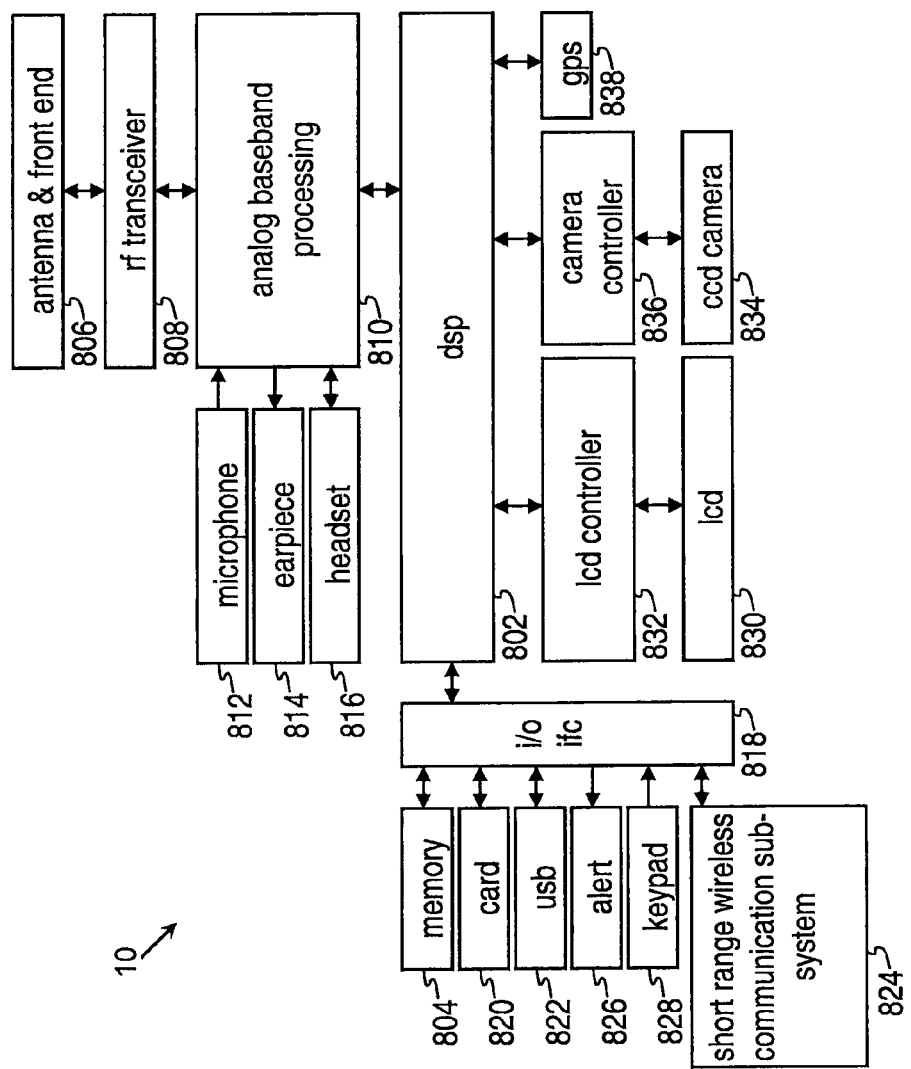
FIG. 10 is a block diagram of a user agent operable for some of the various embodiments of the disclosure.

FIG. 10 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 11:
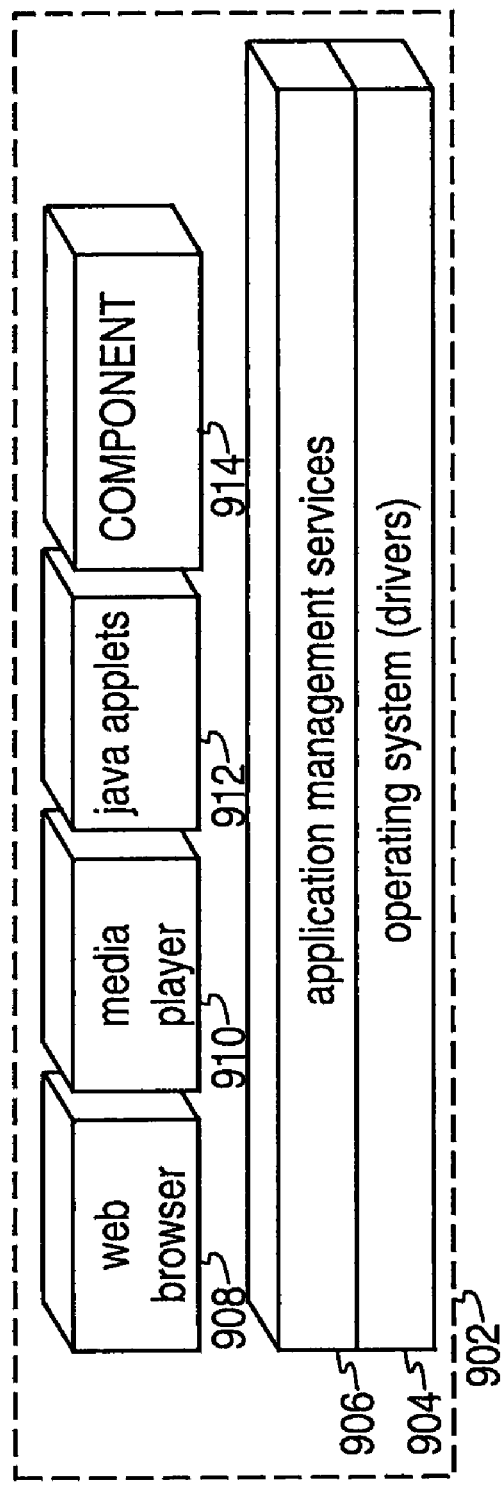
FIG. 11 is a diagram of a software environment that may be implemented on a user agent operable for some of the various embodiments of the disclosure.

FIG. 11 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 11 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 12:
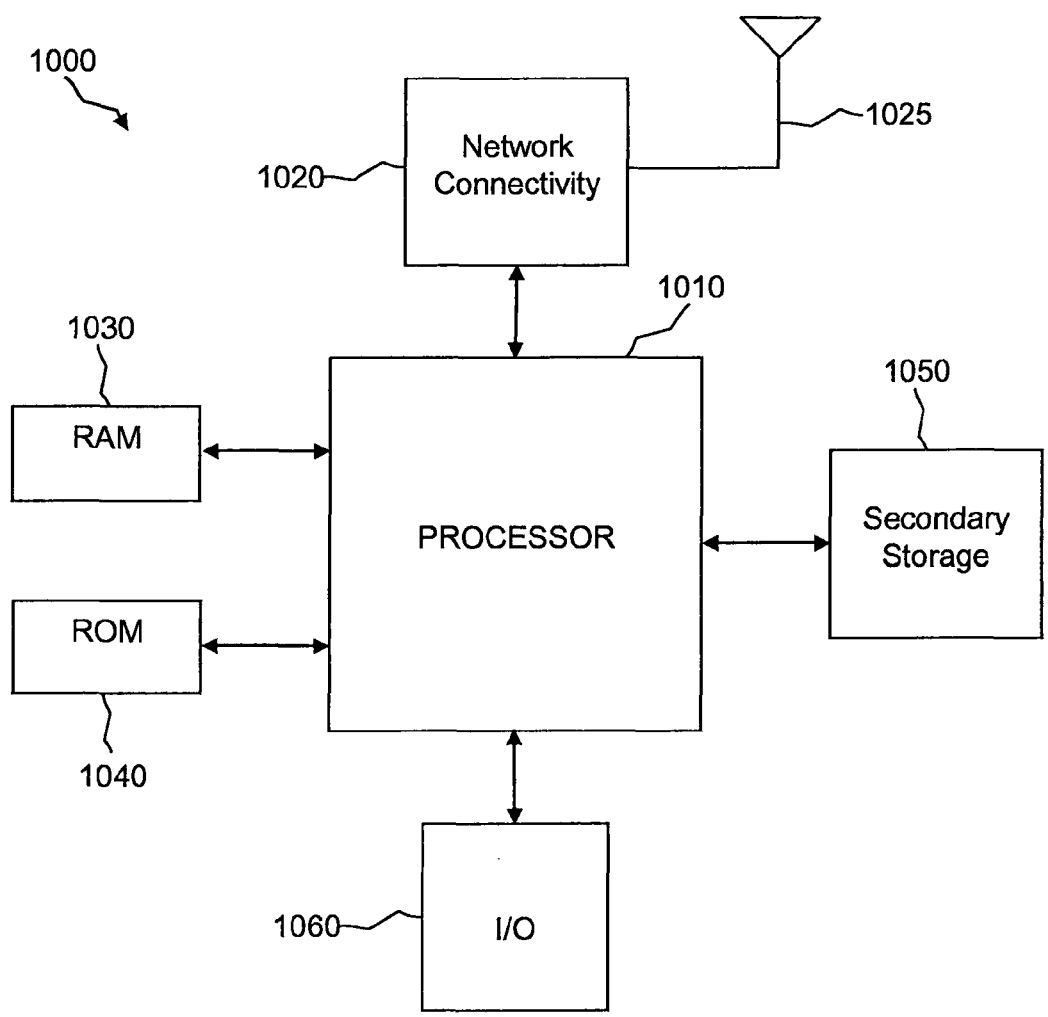
FIG. 12 is an illustrative general purpose computer system suitable for some of the various embodiments of the disclosure.

The UA 10, access device 120, and other components described above might include a processing component that is capable of executing instructions related to the actions described above. FIG. 12 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, TS 36.300, TS 36.306 (for DL HARQ memory buffer sizing based on UE Category), TS 36.212 (for DCI formats) and TS 36.213 (for the number of LTE HARQ processes).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this invention, the following claims are made:

What is claimed is:

1. A method for use with a mobile user agent configured to be able to communicate via N carriers, the method for managing Hybrid Automatic Repeat reQuest (HARQ) processes in a communication system that uses R HARQ process indicators (HPIs) so that the system can support a maximum of (R)(N) HARQ processes, the method comprising the steps of, within the mobile user agent:

using a processor running a program to perform the steps of:

identifying less than (R)(N) unique HPI/carrier combinations;

instantiating HARQ process buffers;

associating each of the identified HPI/carrier combinations with at least one of the instantiated HARQ process buffers;

receiving data;

identifying HPI/carrier combinations associated with the received data; and where the HPI/carrier combination associated with received data is one of the identified combinations, delivering the data to the buffer associated with the HPI/carrier combination.

2. The method of claim 1 wherein the step of identifying less than (R)(N) unique carrier combinations includes the steps of:

identifying a total HARQ process number $HP_{TOT}$ which indicates a total number of HARQ process buffers to be instantiated;

receiving data from an access device; and ascertaining the HPI/carrier combination associated with received data;

where less than $HP_{TOT}$ HARQ process buffers are instantiated and the ascertained HPI/carrier combination is different than the HPI/carrier combinations already associated with existing HARQ process buffers, identifying the ascertained HPI/carrier combination as one of the less than (R)(N) unique carrier combinations.

3. The method of claim 1 wherein at least two HPI/carrier combinations are associated with at least one HARQ process buffer.

4. The method of claim 1 wherein each of a first subset of HPI/carrier combinations associated with a first carrier is uniquely associated with a HARQ process and wherein each of a second subset of HPI/carrier combinations associated with the first carrier is associated with a HARQ process that is also associated with at least one HPI/carrier combination that is associated with a second carrier.

5. The method of claim 1 wherein the step of associating each of the identified HPI/carrier combinations with at least one of the instantiated HARQ process buffers includes fixedly mapping each identified HPI/carrier combination to a specific HARQ process buffer.

6. The method of claim 5 wherein at least two HPI/carrier combinations are mapped to a single HARQ process buffer.

7. The method of claim 6 further including the step of, where at least two HPI/carrier combinations are mapped to a single HARQ process buffer, when data associated with a first of the at least two HPI/carrier combinations is currently stored in the single HARQ process buffer and data is received that is associated with a second of the at least two HPI/carrier combinations, ignoring the received data.

8. The method of claim 1 further including the step of, when an HPI/carrier combination associated with received data is other than one of the identified combinations, ignoring the received data.

9. The method of claim 1 wherein the step of identifying less than (R)(N) unique HPI/carrier combinations includes identifying a total number of HARQ processes $HP_{TOT,k}$ for each carrier where k is a carrier index and where at least one $HP_{TOT,k}$ is less than R.

10. The method of claim 9 wherein the step of identifying less than (R)(N) unique HPI/carrier combinations further includes identifying an initial HARQ process $HP_{INIT-k}$ for each carrier and initializing the total number of HARQ processes $HP_{TOT,k}$ for each carrier to the initial HARQ process $HP_{INIT-k}$ for each carrier.

11. The method of claim 1 wherein the step of identifying less than (R)(N) unique carrier combinations includes the steps of:

receiving data from an access device indicating the number of HARQ processes $HP_k$ to be uniquely associated with at least one of the N carriers where k is a carrier index; and assigning a unique HPI/carrier combination to each of the HARQ processes.

12. The method of claim 11 wherein the carriers include first through Nth carriers and wherein the step of associating each of the identified HPI/carrier combinations with at least one of the instantiated HARQ process buffers includes, assigning HPI/carrier combinations sequentially beginning with the HPI/carrier combinations associated with the first carrier and continuing through the HPI/carrier combinations associated with the Nth carrier.

13. The method of claim 12 wherein the step of instantiating HARQ process buffers includes identifying a total HARQ process number $HP_{TOT}$ that indicates a total number of HARQ processes and wherein the step of associating HPI/carrier combinations with HARQ buffers further includes, where the sum of $HP_k$ for the N carriers is less than $HP_{TOT}$, associating HPI/carrier combinations, for all of the N carriers, with at least a subset of the HARQ processes that are not uniquely associated with a specific carrier.

14. A method for use with a mobile user agent configured to communicate via a plurality of carriers, the method for managing Hybrid Automatic Repeat reQuest (HARQ) processes in a multi-carrier communication system, the method comprising the steps of, within the mobile user agent:
using a processor running a program to perform the steps of:
determining a total number of HARQ processes ($HP_{TOT}$) for use by the user agent;
determining an initial HARQ process number for each of the plurality of carriers;
determining, for each of the plurality of carriers, a total number of HARQ processes ($HP_{TOT,k}$), wherein k is an index of each of the plurality of carriers; and
mapping HARQ process indicators (HPIs) for each of the plurality of carriers to HARQ processes on the user agent, each of the plurality of carriers being allocated a total of $HP_{TOT,k}$ HARQ processes starting at the initial HARQ process number of each carrier.

15. The method of claim 14 further including the steps of, when the combined number of HARQ processes for the plurality of carriers is more than $HP_{TOT}$, mapping a subset of HPIs for each carrier to at least one of the HARQ processes that is not uniquely associated with a specific carrier.

16. The method of claim 14 wherein each initial HARQ process number for each of the plurality of carriers has a value from in the range from 0 to $HP_{TOT}-1$.

17. The method of claim 14 wherein the initial HARQ process number for each of the plurality of carriers is determined by solving the following equation:

$$HP_{INIT,k} = \left\lfloor \frac{HP_{TOT}}{N_{carrier}} \right\rfloor * k$$

where $HP_{INIT,K}$ is the initial HARQ process number for each of the plurality of carriers, $N_{carrier}$ is a total number of the plurality of carriers.

18. The method of claim 14 wherein the total number of HARQ processes is less than a total number of the plurality of carriers multiplied by a maximum number of HARQ processes that may be allocated to each of the plurality of carriers.

19. The method of claim 14 wherein the HARQ processes are identified by three bit numbers that can identify eight distinct HARQ processes.

20. The method of claim 14 wherein the total number of HARQ process is distributed among the carriers.

21. The method of claim 20, wherein the number of HARQ processes is evenly distributed between the carriers.

22. The method of claim 20, wherein the number of HARQ processes is unevenly distributed between the carriers by the access device.

23. A method for use with a mobile user agent configured to communicate via a plurality of carriers, the method for managing Hybrid Automatic Repeat reQuest (HARQ) processes in a multi-carrier communication system, the method comprising the steps of, within the mobile user agent:
using a processor running a program to perform the steps of:
determining a total number of HARQ processes ($HP_{TOT}$) that is less than the number of HARQ processes linearly increased by the number of carriers for use by the user agent;
determining an initial HARQ process number for each of the plurality of carriers;
determining, for each of the plurality of carriers, a total number of HARQ processes ($HP_{TOT,k}$), wherein k is an index of each of the plurality of carriers; and
mapping HARQ processes on the user agent to HARQ process indicators (HPIs) of each of the plurality of carriers, each of the plurality of carriers being allocated a total of $HP_{TOT,k}$ HARQ processes starting at the initial HARQ process number of each carrier.

24. A method for use with a mobile user agent configured to communicate via a plurality of carriers, the method for managing Hybrid Automatic Repeat reQuest (HARQ) processes in a multi-carrier communication system, the method comprising the steps of, within the mobile user agent:
using a processor running a program to perform the steps of:
determining a smaller total number of HARQ processes ($HP_{TOT}$) than the number of HARQ processes linearly increased by the number of carriers for use by the user agent; and
designating HARQ processes as non-carrier-shared HARQ processes when the HARQ processes are mapped to a single one of the plurality of carriers.

25. The method of claim 24, including the steps of:
receiving an HPI at the mobile user agent; and
mapping the received HPI to the available HARQ process.

* * * * *